(12) United States Patent
Mathew et al.

(10) Patent No.: US 8,054,573 B2
(45) Date of Patent: Nov. 8, 2011

(54) SYSTEMS AND METHODS FOR FLY-HEIGHT CONTROL USING SERVO ADDRESS MARK DATA

(75) Inventors: George Mathew, San Jose, CA (US); Yuan Xing Lee, San Jose, CA (US); Hongwei Song, Longmont, CO (US); Jeffrey P. Grundvig, Loveland, CO (US); Viswanath Annampedu, Schnecksville, PA (US)

(73) Assignee: LSI Corporation, Milpitas, CA (US)

( * ) Notice: Subject to any disclaimer, the term of this patent is extended or adjusted under 35 U.S.C. 154(b) by 190 days.

(21) Appl. No.: 12/663,336

(22) PCT Filed: Oct. 27, 2008

(86) PCT No.: PCT/US2008/081381
§ 371 (c)(1),
(2), (4) Date: Dec. 7, 2009

(87) PCT Pub. No.: WO2009/079094
PCT Pub. Date: Jun. 25, 2009

(65) Prior Publication Data
US 2010/0177430 A1  Jul. 15, 2010

Related U.S. Application Data

(60) Provisional application No. 61/013,656, filed on Dec. 14, 2007.

(51) Int. Cl.
*G11B 5/60* (2006.01)
(52) U.S. Cl. .......................................... 360/75
(58) Field of Classification Search .......... None
See application file for complete search history.

(56) References Cited

U.S. PATENT DOCUMENTS

| | | | |
|---|---|---|---|
| 3,973,182 A | 8/1976 | Kataoka | |
| 3,973,183 A | 8/1976 | Kataoka | |
| 4,024,571 A | 5/1977 | Dischert et al. | |
| 4,777,544 A | 10/1988 | Brown et al. | |
| 5,130,866 A | 7/1992 | Klaassen et al. | |
| 5,237,325 A | 8/1993 | Klein et al. | |
| 5,278,703 A | 1/1994 | Rub et al. | |
| 5,309,357 A | 5/1994 | Stark et al. | |

(Continued)

OTHER PUBLICATIONS

Annampedu, V. and Aziz, P.M., "Adaptive Algorithms for Asynchronous Detection of Coded Servo Signals Based on Interpolation", IEEE Trans. on Mag., vol. 41, No. 10, Oct. 2005.

(Continued)

*Primary Examiner* — Joseph Feild
*Assistant Examiner* — James L Habermehl
(74) *Attorney, Agent, or Firm* — Hamilton DeSanctis & Cha

(57) ABSTRACT

Various embodiments of the present invention provide systems and methods for determining fly-height adjustments. For example, various embodiments of the present invention provide storage devices that include a storage medium, a read/write head assembly disposed in relation to the storage medium (278), and a SAM based fly-height adjustment circuit (214). The storage medium (278) includes a plurality of servo data regions (110) that each include a servo address mark (154). The SAM based fly-height adjustment circuit (214) receives the servo address mark (154) from the plurality of servo data regions (110) via the read/write head assembly (276), and calculates a first harmonics ratio (445) based on the received data. The first harmonics ratio (445) is compared with a second harmonics ratio (450) to determine an error (365) in the distance (295) between the read/write head assembly (276) and the storage medium (278).

26 Claims, 4 Drawing Sheets

U.S. PATENT DOCUMENTS

| | | | |
|---|---|---|---|
| 5,341,249 A | 8/1994 | Abbott et al. | |
| 5,377,058 A | 12/1994 | Good et al. | |
| 5,521,948 A | 5/1996 | Takeuchi | |
| 5,523,902 A | 6/1996 | Pederson | |
| 5,668,679 A | 9/1997 | Swearingen et al. | |
| 5,696,639 A | 12/1997 | Spurbeck et al. | |
| 5,781,129 A | 7/1998 | Schwartz et al. | |
| 5,798,885 A | 8/1998 | Saiki et al. | |
| 5,835,295 A | 11/1998 | Behrens | |
| 5,844,920 A | 12/1998 | Zook et al. | |
| 5,852,524 A | 12/1998 | Glover et al. | |
| 5,986,830 A | 11/1999 | Hein | |
| 5,987,562 A | 11/1999 | Glover | |
| 6,009,549 A | 12/1999 | Bliss et al. | |
| 6,023,383 A | 2/2000 | Glover et al. | |
| 6,069,583 A | 5/2000 | Silvestrin et al. | |
| 6,081,397 A | 6/2000 | Belser | |
| 6,111,712 A | 8/2000 | Vishakhadatta et al. | |
| 6,208,478 B1 | 3/2001 | Chiu et al. | |
| 6,278,591 B1 | 8/2001 | Chang | |
| 6,400,518 B1 | 6/2002 | Bhaumik et al. | |
| 6,404,829 B1 | 6/2002 | Sonu | |
| 6,441,661 B1 | 8/2002 | Aoki et al. | |
| 6,490,110 B2 | 12/2002 | Reed et al. | |
| 6,493,162 B1 | 12/2002 | Fredrickson | |
| 6,519,102 B1 | 2/2003 | Smith | |
| 6,530,060 B1 | 3/2003 | Vis et al. | |
| 6,603,622 B1 | 8/2003 | Christiansen et al. | |
| 6,606,048 B1 | 8/2003 | Sutardja | |
| 6,611,390 B1 * | 8/2003 | Egan | 360/31 |
| 6,633,447 B2 | 10/2003 | Franck et al. | |
| 6,646,822 B1 | 11/2003 | Tuttle et al. | |
| 6,657,802 B1 | 12/2003 | Ashley et al. | |
| 6,775,529 B1 | 8/2004 | Roo | |
| 6,788,484 B2 | 9/2004 | Honma | |
| 6,813,108 B2 | 11/2004 | Annampedu et al. | |
| 6,816,328 B2 | 11/2004 | Rae | |
| 6,839,014 B2 | 1/2005 | Uda | |
| 6,856,183 B2 | 2/2005 | Annampedu | |
| 6,876,511 B2 | 4/2005 | Koyanagi | |
| 6,912,099 B2 | 6/2005 | Annampedu et al. | |
| 6,963,521 B2 | 11/2005 | Hayashi | |
| 6,999,257 B2 | 2/2006 | Takeo | |
| 6,999,264 B2 | 2/2006 | Ehrlich | |
| 7,002,767 B2 | 2/2006 | Annampedu et al. | |
| 7,038,875 B2 | 5/2006 | Lou et al. | |
| 7,072,137 B2 | 7/2006 | Chiba | |
| 7,082,005 B2 | 7/2006 | Annampedu et al. | |
| 7,092,462 B2 | 8/2006 | Annampedu et al. | |
| 7,116,504 B1 | 10/2006 | Oberg | |
| 7,126,776 B1 | 10/2006 | Warren, Jr. et al. | |
| 7,136,250 B1 | 11/2006 | Wu et al. | |
| 7,154,689 B1 | 12/2006 | Shepherd et al. | |
| 7,167,328 B2 | 1/2007 | Annampedu et al. | |
| 7,180,693 B2 | 2/2007 | Anaampedu et al. | |
| 7,187,739 B2 | 3/2007 | Ma | |
| 7,191,382 B2 | 3/2007 | James et al. | |
| 7,193,544 B1 | 3/2007 | Fitelson et al. | |
| 7,193,798 B2 | 3/2007 | Byrd et al. | |
| 7,199,961 B1 | 4/2007 | Wu et al. | |
| 7,203,013 B1 | 4/2007 | Han et al. | |
| 7,206,146 B2 | 4/2007 | Flynn et al. | |
| 7,230,789 B1 | 6/2007 | Brunnett et al. | |
| 7,253,984 B1 | 8/2007 | Patapoutian et al. | |
| 7,301,717 B1 | 11/2007 | Lee et al. | |
| 7,308,057 B1 | 12/2007 | Patapoutian | |
| 7,359,139 B1 * | 4/2008 | Wu et al. | 360/75 |
| 7,362,536 B1 | 4/2008 | Liu et al. | |
| 7,375,918 B1 | 5/2008 | Shepherd et al. | |
| 7,411,531 B2 | 8/2008 | Aziz et al. | |
| 7,420,498 B2 | 9/2008 | Barrenscheen | |
| 7,423,827 B2 | 9/2008 | Neville et al. | |
| 7,446,690 B2 | 11/2008 | Kao | |
| 7,499,238 B2 | 3/2009 | Annampedu | |
| 7,508,616 B2 * | 3/2009 | Fitzpatrick et al. | 360/75 |
| 7,518,820 B1 * | 4/2009 | Wu et al. | 360/75 |
| 7,620,101 B1 | 11/2009 | Jenkins | |
| 7,715,135 B1 * | 5/2010 | Sutardja et al. | 360/75 |
| 2002/0001151 A1 | 1/2002 | Lake | |
| 2002/0150179 A1 | 10/2002 | Leis et al. | |
| 2002/0176185 A1 | 11/2002 | Fayeulle et al. | |
| 2002/0181377 A1 | 12/2002 | Nagata et al. | |
| 2003/0095350 A1 | 5/2003 | Annampedu et al. | |
| 2005/0046982 A1 | 3/2005 | Liu et al. | |
| 2005/0157415 A1 | 7/2005 | Chiang | |
| 2005/0243455 A1 | 11/2005 | Annampedu | |
| 2007/0071152 A1 | 3/2007 | Chen et al. | |
| 2007/0104300 A1 | 5/2007 | Esumi et al. | |
| 2007/0183073 A1 | 8/2007 | Sutardja et al. | |
| 2007/0230015 A1 | 10/2007 | Yamashita | |
| 2007/0263311 A1 | 11/2007 | Smith | |
| 2008/0080082 A1 | 4/2008 | Erden et al. | |
| 2008/0212715 A1 | 9/2008 | Chang | |
| 2008/0266693 A1 | 10/2008 | Bliss et al. | |
| 2009/0002862 A1 | 1/2009 | Park | |
| 2009/0142620 A1 | 6/2009 | Yamamoto et al. | |

OTHER PUBLICATIONS

Aziz and Annampedu, "Asynchronous Maximum Likelihood (ML) Detection of Servo repeatable Run Out (RRO) Data", 2006.

Aziz & Annampedu, "Interpolation Based Maximum-Likelihood(ML) Detection of Asynchronous Servo Repeatable Run Out (RRO) Data", IEEE Int. Mag. Con., vol. 42, No. 10, Oct. 2006.

* cited by examiner

SYSTEMS AND METHODS FOR FLY-HEIGHT CONTROL USING SERVO ADDRESS MARK DATA

CROSS REFERENCE TO RELATED APPLICATIONS

The present application claims priority to (is a non-provisional of) U.S. Pat. App. No. 61/013,656 entitled "SAM Based Approach for Harmonic Estimation During Servo Sector", and filed Dec. 14, 2007 by Mathew et al. The entirety of the aforementioned application is incorporated herein by reference for all purposes.

BACKGROUND OF THE INVENTION

The present inventions are related to systems and methods for accessing a storage medium, and more particularly to systems and methods for determining the location of a read/write head assembly in relation to a storage medium.

Writing information to a magnetic storage medium includes generating a magnetic field in close proximity to the storage medium to be written. This may be done using a read/write head assembly as are commonly known in the art, and is highly dependent on properly positioning the read/write head assembly in relation to a magnetic storage medium. The distance between the read/write head assembly and the storage medium is commonly referred to as fly-height. Proper control of the fly-height helps to assure that the read back signal exhibits the best possible signal-to-noise ratio, and thereby improves performance. In a typical implementation, fly-height is determined based on harmonic measurements during a non-operational period. Such an approach uses a vacant or dedicated area on the magnetic storage medium to write a periodic pattern from which the harmonics may be measured. While the approach provides a reasonable static estimate of fly-height, it does not provide an indication of any change in fly-height occurring during standard operational periods. As such, the approaches do not provide an ability to adjust for changes occurring during the operation of the disk. Other approaches use channel bit density (CBD) estimation to determine fly-height. This approach relies on estimating the CBD from various ADC samples by means of a de-convolution approach. This is based on truncating the correlation-length of the channel impulse response, and approximating the channel impulse response by the dipulse (bit) response. The de-convolution requires matrix inversion, and it becomes very difficult to implement the matrix inversion as the matrix size increases, which it does as the truncation length of the channel correlation is relaxed. It is also difficult to use this approach to obtain the CBD variation in continuous fashion, as it works on a block by block basis. Yet other approaches use an available AGC signal for inferring the fly-height. Such an approach is able to continuously monitor fly-height during normal operational periods, however, the accuracy of the approach is significantly diminished due to PVT-induced variations in the signal/circuits. None of the aforementioned approaches facilitate fly-height monitoring and control during normal write operations.

Hence, for at least the aforementioned reasons, there exists a need in the art for advanced systems and methods for determining fly-height.

BRIEF SUMMARY OF THE INVENTION

The present inventions are related to systems and methods for accessing a storage medium, and more particularly to systems and methods for determining the location of a read/write head assembly in relation to a storage medium.

Various embodiments of the present invention provide storage devices that include a storage medium, a read/write head assembly disposed in relation to the storage medium, and a servo address mark (SAM) based fly-height adjustment circuit. The storage medium includes a plurality of servo data regions that each include a servo address mark. The SAM based fly-height adjustment circuit receives the servo address mark from the plurality of servo data regions via the read/write head assembly, and calculates a first harmonics ratio based on the received data. The first harmonics ratio is compared with a second harmonics ratio to determine an error in the distance between the read/write head assembly and the storage medium.

In some instances of the aforementioned embodiments, the plurality of servo data regions includes a first servo data region and a second servo data region. The servo address mark from the first servo data region includes at least a first sample, a second sample, a third sample and a fourth sample; and the servo address mark from the second servo data region includes at least a fifth sample, a sixth sample, a seventh sample and an eighth sample. In such cases, calculating the first harmonics ratio includes: forming an averaged sample set, calculating at least two harmonics based on the averaged sample set, and calculating a ratio of the two harmonics. The averaged sample set includes at least a first average value, a second average value, a third average value and a fourth average value. The first average value incorporates the first sample and the fifth sample, the second average value incorporates the second sample and the sixth sample, the third average value incorporates the third sample and the seventh sample, and the fourth average value incorporates the fourth sample and the eighth sample. In such instances, calculating the at least two harmonics based on the averaged sample set includes performing a discrete Fourier transform. In some cases, the servo address mark from the first servo data region is identical to the servo address mark from the second servo data region. In particular cases, the servo address mark from the first servo data region is truncated, and the servo address mark from the second servo data region is truncated. In one or more cases, the truncation is operable to reduce inter-symbol interference with data proximate to the servo address mark. The truncation may include removing one or more samples of the servo address mark nearest a preceding pattern in the servo data region and/or one or more samples of the servo address mark nearest a subsequent pattern in the servo data region. The preceding pattern may be a preamble pattern and the succeeding pattern may be a Gray code pattern.

Other embodiments of the present invention provide methods for identifying a distance error based on servo address mark data. Such methods include providing a first harmonics ratio corresponding to a known position and providing a storage medium that includes a first servo data region and a second servo data region. Both the first servo data region and the second servo data region include a servo address mark. The methods further include accessing the servo address mark from the first servo data region and the servo address mark from the second servo data region, and calculating a second harmonics ratio based on a combination of the servo address mark from the first servo data region and the servo address mark from the second servo data region. The first harmonics ratio is compared with the second harmonics ratio to determine a distance error. In some instances of the aforementioned embodiments, the first harmonics ratio is calculated during an initialization phase.

In various instances of the aforementioned embodiments, the servo address mark from the first servo data region includes at least a first sample, a second sample, a third sample and a fourth sample; and the servo address mark from the second servo data region includes at least a fifth sample, a sixth sample, a seventh sample and an eighth sample. In such instances, calculating the second harmonics ratio includes: forming an averaged sample set, calculating at least two harmonics based on the averaged sample set, and calculating a ratio of the two harmonics. The averaged sample set includes at least a first average value, a second average value, a third average value and a fourth average value. The first average value incorporates the first sample and the fifth sample, the second average value incorporates the second sample and the sixth sample, the third average value incorporates the third sample and the seventh sample, and the fourth average value incorporates the fourth sample and the eighth sample. In some cases, calculating the at least two harmonics based on the averaged sample set includes performing a discrete Fourier transform. In one or more cases, the servo address mark from the first servo data region is truncated, and the servo address mark from the second servo data region is truncated. In some cases, the truncation removes one or more samples of the servo address mark selected from a group consisting of: one or more samples nearest a preceding pattern in the servo data region, and one or more samples nearest a succeeding pattern in the servo data region.

Yet other embodiments of the present invention provide SAM based fly-height adjustment circuits. Such circuits include a sample averaging circuit, a discrete Fourier transform circuit, and a harmonics ratio calculation circuit. The sample averaging circuit receives at least a first sample set corresponding to a servo address mark from a first servo data region and a second sample set corresponding to a servo address mark from a second servo data region, performs an averaging calculation including at least the first sample set and the second sample set, and provides an averaged sample set. The discrete Fourier transform circuit receives the averaged sample set and calculates at least two harmonics, and the harmonics ratio calculation circuit calculates a ratio of the two harmonics. In some instances of the aforementioned embodiments, the circuits further include a memory storing another harmonics ratio, and a comparator. The comparator is operable to provide a distance error signal based at least in part on a comparison of the previously calculated harmonics ratio and the other harmonics ratio.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for accessing a storage medium, and more particularly to systems and methods for determining the location of a read/write head assembly in relation to a storage medium.

Various embodiments of the present invention provide the capability to monitor and/or adjust the fly-height using servo address mark data received as part of servo data distributed on a storage medium. In some cases, the servo address mark is truncated on one or both ends to minimize any interference due to data surrounding the servo address mark. In some cases, corresponding samples from servo address marks derived from two or more sectors may be used to perform fly-height adjustment. As just some advantages of embodiments of the present invention, special patterns designed to perform fly-height control are not necessary. This results in a reduction in control information that is required on a storage medium and a corresponding increase in usable storage area on the storage medium. Further, using such approaches, monitoring and control of fly-height may be done in parallel to standard read and write accesses to the storage medium as the information used to perform fly-height control is also accessed during such reads and writes. Based on the disclosure provided herein, one of ordinary skill in the art will recognize a variety of other advantages that may be achieved through implementation of different embodiments of the present invention.

Figure 1:
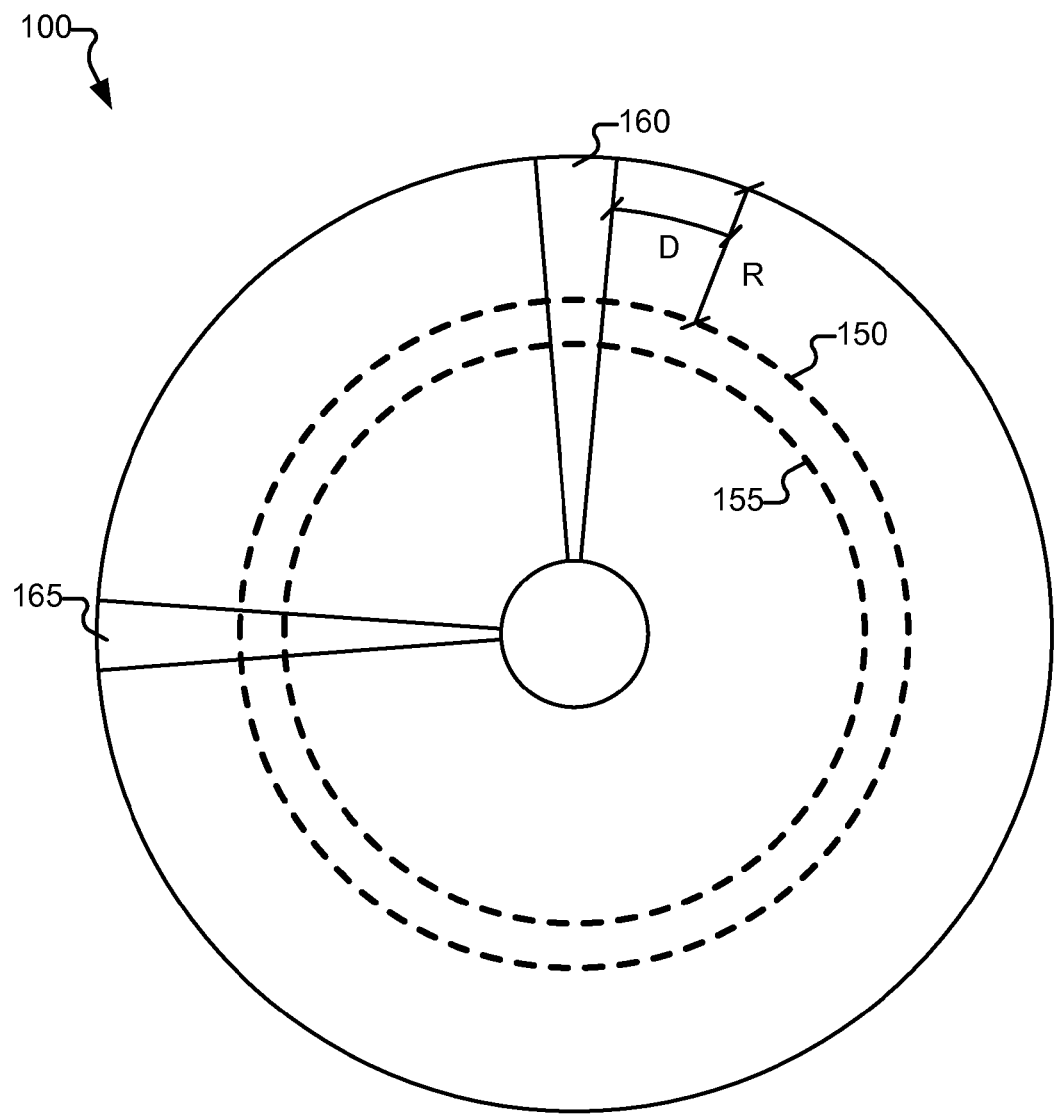
FIG. 1 depicts an existing storage medium including servo data.

FIG. 1 shows a storage medium 100 with two exemplary tracks 150, 155 indicated as dashed lines. The tracks have embedded servo data written within wedges 160, 165 (these wedges may be referred to herein as servo sector or sectors). These wedges include a servo data pattern 110 that is used for control and synchronization of the read/write head assembly over a desired location on storage medium 100. In particular, these wedges generally include a preamble pattern 152 followed by a servo address mark 154 (SAM). Servo address mark 154 is followed by a Gray code 156, and Gray code 156 is followed by burst information 158. It should be noted that while two tracks and two wedges are shown, hundreds of each would typically be included on a given storage medium. Further, it should be noted that a servo data set may have two or more fields of burst information. In some cases, spacers may be disposed between one of more of preamble pattern 152, servo address mark 154, Gray code 156 and/or burst information 158. Servo address mark is a known bit pattern of defined length. Further, the servo address mark is the same in one wedge as it is in another. Thus, for example, the servo address mark in wedge 160 would be the same as the servo address mark in wedge 165.

In operation, data from storage medium 100 is provided to a read channel circuit (not shown) as a serial stream. The read channel circuit operates to detect preamble pattern 152. Preamble pattern 152 exhibits a particular phase and frequency. This phase and frequency information is used to recover a sampling clock that is used to sample the remaining portion of servo data pattern 110. In particular, servo address mark 154 is identified and the location thereof is used to time the subsequent sampling and processing of Gray code 156 and burst information 158.

Figure 2A:
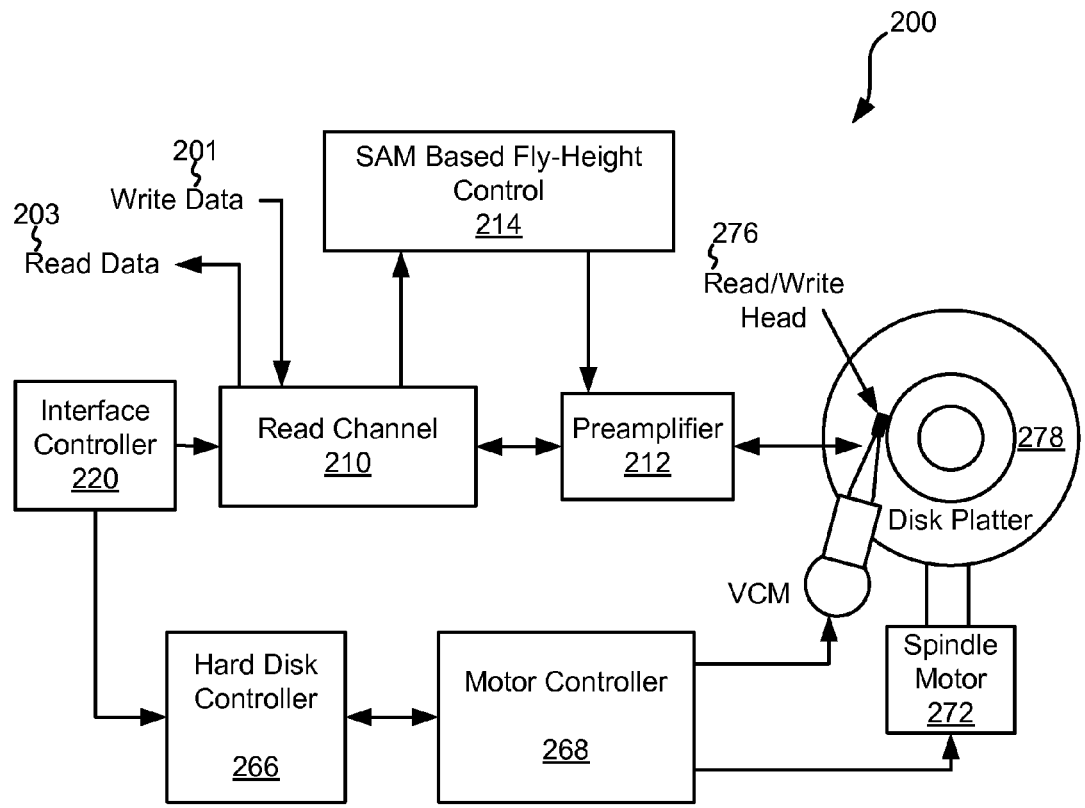
FIG. 2A depicts a storage device including a read channel with a servo based fly-height control circuit in accordance with one or more embodiments of the present invention.

Turning to FIG. 2, a storage system 200 including a SAM based fly-height control circuit 214 is shown in accordance with various embodiments of the present invention. Storage system 200 may be, for example, a hard disk drive. In addition, storage system 200 includes an interface controller 220, a preamplifier 212, a hard disk controller 266, a motor controller 268, a spindle motor 272, a disk platter 278, and a read/write head assembly 276. Interface controller 220 controls addressing and timing of data to/from disk platter 278. The data on disk platter 278 consists of groups of magnetic signals that may be detected by read/write head assembly 276 when the assembly is properly positioned over disk platter 278. In a typical read/write operation, read/write head assembly 276 is accurately positioned by motor controller 268 over a desired data track on disk platter 278. Motor controller 268 both positions read/write head assembly 276 in relation to disk platter 278 and drives spindle motor 272 by moving read/write head assembly to the proper data track on disk platter 278 under the direction of hard disk controller 266. Spindle motor 272 spins disk platter 278 at a determined spin rate (RPMs). A read channel circuit 210 receives information from preamplifier 212 and performs a data decode/detection process as is known in the art to recover the data originally written to disk platter 278 as read data 203. In addition, read channel circuit 210 receives write data 201 and provides it to preamplifier 212 in a form writable to disk platter 278 as is known in the art.

Figure 2B:
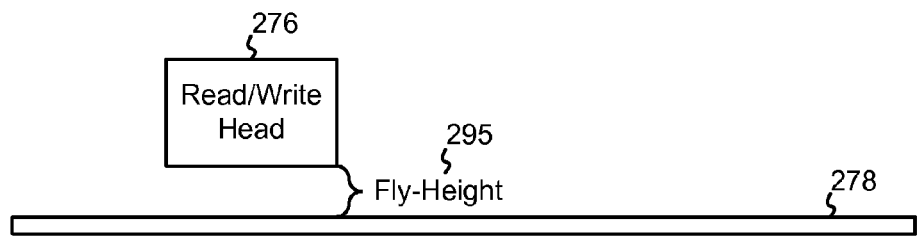
FIG. 2B depicts the read/write head assembly of FIG. 2A disposed in relation to the disk platter of FIG. 2A.

SAM based fly-height compensation circuit 214 receives an analog to digital conversion of the data from preamplifier 212. From this information, SAM based fly-height compensation circuit 214 utilizes samples of two or more servo address marks that exhibit at least two harmonics to yield a fly-height adjustment value. FIG. 2B depicts an exemplary fly-height 295, which is the distance between read/write head assembly 276 and disk platter 278. In some embodiments of the present invention, SAM based fly-height compensation circuit 214 is implemented consistent with the circuit described below in relation to FIG. 3.

In operation, read/write head assembly 278 is positioned adjacent the proper data track, and magnetic signals representing data on disk platter 278 are sensed by read/write head assembly 276 as disk platter 278 is rotated by spindle motor 272. The sensed magnetic signals are provided as a continuous, minute analog signal representative of the magnetic data on disk platter 278. This minute analog signal is transferred from read/write head assembly 276 to read channel circuit 210 via preamplifier 212. Preamplifier 212 is operable to condition the minute analog signals accessed from disk platter 278. In addition, preamplifier 212 is operable to condition data from read channel circuit 210 that is destined to be written to disk platter 278. In turn, read channel circuit 210 decodes and digitizes the received analog signal to recreate the information originally written to disk platter 278. This data is provided as read data 203 to a receiving circuit. A write operation is substantially the opposite of the preceding read operation with write data 201 being provided to read channel module 210. This data is then encoded and written to disk platter 278. During the read and write processes (or during an offline time period), SAM based fly-height compensation circuit 214 receives the servo address mark in a given sector. Samples of the servo address mark are analyzed to yield at least two non-zero harmonics using a discrete Fourier transform. A ratio between the two harmonics is calculated, and the calculated ratio is compared with a previously determined ratio to detect any change. The previously determined ratio is associated with a known fly-height, and as such, the detected change corresponds to a change in fly-height. Based on the detected change a corresponding fly-height adjustment value is calculated and applied. In operation, the aforementioned fly-height adjustment operates to reduce the detected change. Of interest, SAM based fly-height compensation circuit 214 provides for closed loop fly-height control during either or both of a standard read process and a standard write process.

Figure 3:
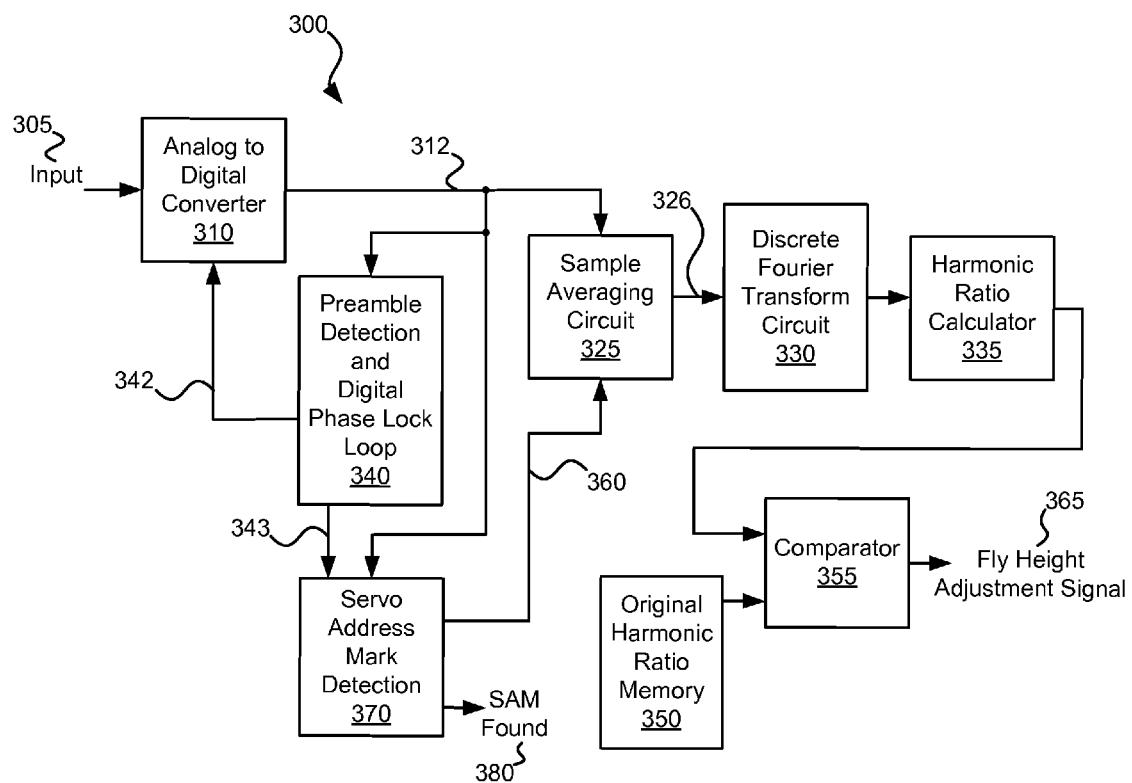
FIG. 3 depicts a portion of a data processing system that includes a SAM based fly-height control circuit in accordance with one or more embodiments of the present invention.
Figure 3:
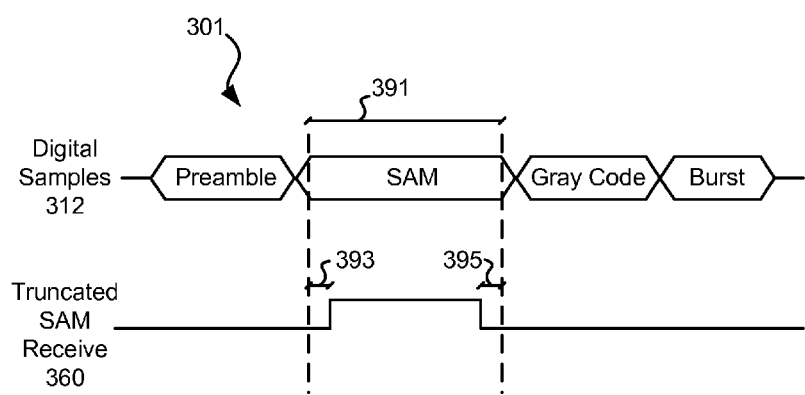

Turning to FIG. 3, a portion of a data processing system 300 including a SAM based fly-height control circuit is shown in accordance with one or more embodiments of the present invention. In addition to the SAM based fly-height control circuit, data processing system 300 includes an analog to digital converter 310 and a preamble detection and digital phase lock loop circuit 340. The SAM based fly-height control circuit includes a servo address mark detection circuit 370, a sample averaging circuit 325, discrete Fourier transform circuit 330, a harmonics ratio calculation circuit 335, a comparator circuit 355, and an original harmonics ratio memory 350.

Analog to digital converter 310 receives an input 305. Analog to digital converter 310 may be any analog to digital converter that is capable of receiving an analog input, and sampling the analog input based on a sampling clock 342. Based on the disclosure provided herein one of ordinary skill in the art will recognize a variety of analog to digital converters that may be used in accordance with different embodiments of the present invention. The sampling process produces a series of digital samples 312 corresponding to input 305. In some cases, input 305 is derived from a read/write head assembly (not shown) that senses information from a magnetic storage medium (not shown) in read channel 210. The sensed information is converted to input 305 by an analog front end circuit (not shown). Based on the disclosure provided herein, one of ordinary skill in the art will recognize a variety of potential sources of input 305.

Digital samples 312 are provided to a preamble detection and digital phase lock loop circuit 340. Preamble detection and digital phase lock loop circuit 340 is operable to detect a known preamble pattern, and to adjust the phase and/or frequency of sampling clock 342 based upon digital samples 312 of the detected preamble pattern. Preamble detection and sampling clock synchronization may be done using any process known in the art for recovering a clock from a received data stream. For example, digital phase lock loop circuit 340 may be implemented consistent with preamble detector and clock recovery circuits used in existing hard disk drive systems.

Once a preamble is detected, a preamble detected signal 343 is asserted. At this point, a SAM detection circuit 370 begins querying digital samples 312 for a known servo address mark pattern. SAM detection circuit 370 is operable to detect a servo address mark and to assert a SAM Found signal 380 upon identifying the servo address mark. This SAM Found signal may be comparable to SAM Found signals that have been used in the existing art to synchronize the processing of subsequent Gray code data and burst information. In addition to SAM Found signal 380, SAM detection circuit 370 issues a truncated SAM receive signal 360. Truncated SAM receive signal 360 may be asserted coincident with or at some point after the servo address mark information in digital samples 312 begins and is de-asserted coincident with or sometime before the end of the servo address mark information in digital samples 312. In some particular embodiments of the present invention, truncated SAM receive signal 360 is asserted one bit period of sampling clock 342 after the servo address mark information in digital samples 312 begins, and is de-asserted one bit period of sampling clock 342 before the servo address mark information in digital samples 312 ends. In some cases, a FIFO memory (not shown) may be used to store digital samples 312 for a period until the actual location of truncated SAM receive signal 360 can be established. Where such a FIFO is used, the samples corresponding to the assertion of truncated SAM receive signal 360 can be provided to sample averaging circuit 325 for processing.

A timing diagram 301 shows the relationship of truncated SAM receive signal 360 to the SAM information incorporated in digital samples 312. In particular, the SAM information extends for a period 391 (e.g., a defined number of cycles of sampling clock 342), but truncated SAM receive signal 360 may be asserted for the same length as or less than period 391. In particular, truncated SAM receive signal 360 is not asserted during a period 393 or during a period 395. The duration of period 393 may be the same or different from that of period 395, and each of periods 393, 395 may be greater than or equal to zero. As mentioned before, in some embodiments of the present invention, period 393 and period 395 are approximately one bit period of sampling clock 342.

Digital samples 312 received when truncated SAM receive signal 360 is asserted are averaged together by sample averaging circuit 325. The samples averaged using sample averaging circuit 325 may be obtained from servo address mark information across two or more sectors. Such averaging across sectors reduces noise evident during sampling of any given sector. As an example, where the averaged region of the servo address mark (i.e., the region corresponding to the assertion of truncated SAM receive signal 360) includes four samples, averaging across two sectors results in the following sample average set:

$$\text{Averaged Set [3:0]} = \frac{\text{SectorA [3:0]} + \text{SectorB [3:0]}}{2}.$$

It should be noted that the above mentioned average is merely exemplary, and may be modified depending upon the particular design. For example, the averaging may be expanded to include samples from three or more sectors, and any number of available samples of the servo address mark may be incorporated. In particular, where a larger number of samples are to be used, the duration of period 393 and/or period 395 may be decreased. Where a reduced number of samples are to be used, the duration of period 393 and/or period 395 may be increased. As discussed below, use of a larger number of samples allows for selection from among a corresponding larger number of harmonics. Based upon the disclosure provided herein, one of ordinary skill in the art will recognize a variety of averages that may be used in relation to different embodiments of the present invention.

As the samples averaged using sample averaging circuit 325 are obtained from servo address mark information derived across two or more sectors, it may desirable to minimize the impact based on data surrounding the servo address mark pattern that may change from sector to sector. A non-zero duration for period 393 is designed to limit any interference from the preamble pattern preceding the servo address mark on samples that are used in the averaging process. Similarly, a non-zero duration for period 395 is designed to limit any interference from the subsequent Gray code on samples that are used in the averaging process. By rejecting servo address mark samples nearest the preceding preamble and succeeding Gray code pattern, the servo address mark samples ultimately incorporated in the average exhibit only minimal, if any, impact (e.g., inter-symbol interference) from the preceding and succeeding patterns. In some cases, period 393 may be zero and period 395 may be non-zero where the preamble is the same across sectors but the Gray code pattern changes across sectors. Based upon the disclosure provided herein, one of ordinary skill in the art will recognize appropriate durations for period 393 and period 395 useful to alleviate any non-uniform interference with servo address mark samples across sectors.

Once a sufficient number of samples have been averaged by sample averaging circuit 325, a sample average set 326 is provided to a discrete Fourier transform circuit 330. Discrete Fourier transform circuit 330 calculates two or more harmonics associated with the received samples. The calculated harmonics are provided to a harmonics ratio calculation circuit 335 that calculates a defined harmonics ratio in accordance with the following equation:

$$\text{Calculated Harmonics Ratio} = \log\left(\frac{\text{harmonic } A}{\text{harmonic } B}\right).$$

In some cases, discrete Fourier transform circuit 330 may calculate only two selected harmonics (i.e., harmonic A and harmonic B) out of a large number of possible harmonics. The harmonics may be selected based on a spectral signal to noise ratio provided by a given harmonic, and the sensitivity of the above mentioned ratio to changes in fly-height, and/or resolution achievable by the selected ratio.

In some cases, the particular harmonics to be used in the harmonics ratio (e.g., the first harmonic and the fifth harmonic) are selected prior to operation of the system. A corresponding original harmonics ratio was calculated at startup and stored to a memory 350. The original harmonics ratio is calculated in a similar way, but is done when the read/write head assembly is a known distance from the storage medium (i.e., the original harmonics ratio corresponds to a known fly-height value). The newly calculated harmonics ratio is compared with the previously stored harmonics ratio using a comparator circuit 355. The output of comparator circuit 355 is a fly-height adjustment signal 365 that exhibits a value as defined by the following equation:

fly height adjustment signal=Original Harmonics Ratio−Calculated Harmonics Ratio.

When the fly-height is unchanged from when the original harmonics ratio was determined, fly-height adjustment signal 365 is approximately zero. Thus, any fly-height adjustment is done by driving the value of fly-height adjustment signal 365 to zero.

Figure 4:
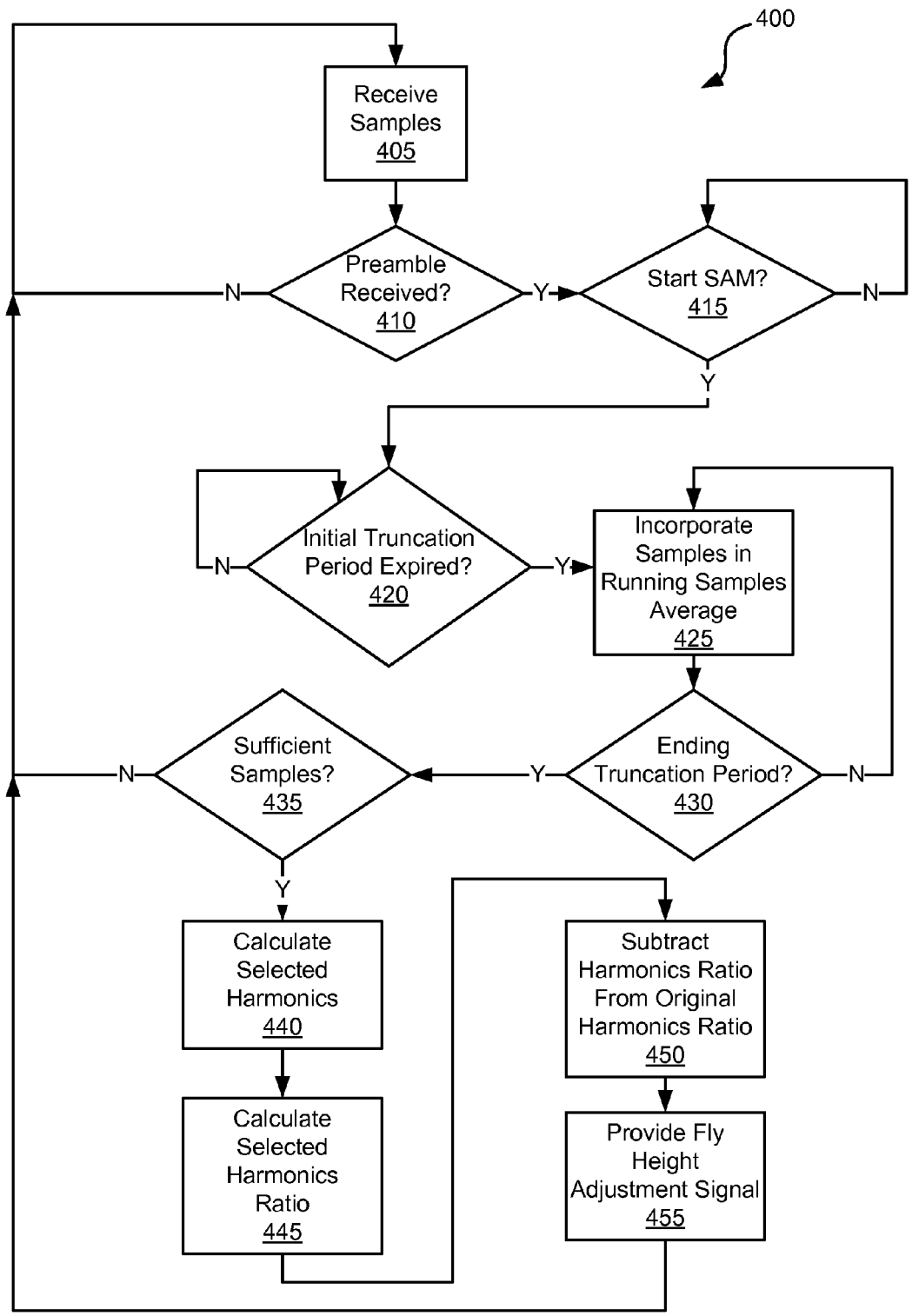
FIG. 4 is a flow diagram showing a method in accordance with various embodiments of the present invention for providing fly-height control using servo data.

Turning to FIG. 4, a flow diagram 400 depicts a method in accordance with various embodiments of the present invention for providing fly-height control using servo address marks from two or more sectors. Following flow diagram 400, a series of digital samples are received (block 405). The series of digital samples may correspond to an analog data stream derived from a storage medium. The series of digital samples are queried for the presence of a preamble pattern (block 410). In some cases, the preamble pattern is a 2 T preamble pattern which includes a number of instances of two positive samples followed by two negative samples (e.g., ++−−++−−++−− . . . ). It should be noted, however, that other preamble patterns (e.g., a 4 T preamble pattern) are possible in accordance with different embodiments of the present invention. A standard synchronization is performed using the identified preamble pattern. Such synchronization includes adjusting the phase and/or frequency of a sampling clock and adjusting any gain factors as is known in the art.

The process of preamble detection and synchronization continues until it completes (block 410). Once a preamble pattern has been identified and the synchronization process completed (block 410), it is determined whether the succeeding servo address mark region has started (block 415). Where the servo address mark region has begun (block 415), an initial truncation period is awaited (block 420). It should be noted that the servo address mark may not be identified before the initial truncation period expires. In such a case, a FIFO memory may be employed in the processing to store the samples that may correspond to the servo address mark until servo address mark is identified. At that point, the samples corresponding to the identified servo address mark may be retrieved from the FIFO and processed in accordance with the following process blocks. The initial truncation period corresponds to the previously described period 393.

Once the initial truncation period has elapsed (block 420), the samples corresponding to the servo address mark are incorporated into a running average of samples (block 425). This process of averaging is performed for all samples occurring after the initial truncation period (block 420) and continuing until the start of an ending truncation period (block 430). As an example, where the averaged region of the servo address mark (i.e., the region of the servo address mark corresponding to period 391) includes four samples, averaging across two sectors results in the following sample average set:

$$\text{Averaged Set}[3:0] = \frac{\text{SectorA}[3:0] + \text{SectorB}[3:0]}{2}.$$

It should be noted that the above mentioned average is merely exemplary, and may be modified depending upon the particular design. For example, the average may be expanded to include samples from three or more sectors, and any number of available samples corresponding to period 391 of the servo address mark may be incorporated. In one particular embodiment of the present invention, the average includes samples from two hundred sectors with each sample set including ten samples. Based upon the disclosure provided herein, one of ordinary skill in the art will recognize that other numbers of samples may be incorporated in accordance with different embodiments of the present invention.

Once the ending truncation period starts (block 430), it is determined whether a sufficient number of samples has been incorporated into the running average (block 435). For example, in one embodiment of the present invention samples are gathered across two hundred sectors. Where the number of samples is not yet sufficient (block 435), the processes of blocks 405-430 are repeated to gather additional samples. Otherwise, where a sufficient number of samples have been gathered (block 435), at least two harmonics are calculated based on the averaged samples (block 440). The harmonics may be calculated using a discrete Fourier transform as is known in the art. It should be noted that longer servo address mark patterns (i.e., a longer duration period 391) will yield the possibility of a greater number of harmonics from which to choose.

Two of the non-zero harmonics are then used to calculate a harmonics ratio (block 445). For example, if the selected harmonics correspond to a third harmonic and a seventh harmonic, the harmonics ratio may be calculated in accordance with either of the following two equations:

$$\text{Calculated Harmonics Ratio} = \log\left(\frac{\text{seventh harmonic}}{\text{third harmonic}}\right); \text{or}$$

$$\text{Calculated Harmonics Ratio} = \log\left(\frac{\text{third harmonic}}{\text{seventh harmonic}}\right).$$

It should be noted that other harmonics may be chosen for the ratio calculation. Any two harmonics available from the averages sample set may be chosen. The harmonics may be selected based on a spectral signal to noise ratio provided by a given harmonic, and the sensitivity of the above mentioned ratio to changes in fly-height, and/or resolution achievable by the selected ratio. At some point during setup or initialization of the storage device, a corresponding harmonics ratio is defined along with an ideal fly-height associated with the ratio is determined (e.g., an original harmonics ratio). For example, when a storage device is powered on, fly-height may be adjusted using any approach known in the art. Once this ideal fly-height is established, the processes of preamble synchronization, SAM detection, and harmonics ratio calculation are performed for this initial state (block 405-block 445).

The newly calculated harmonics ratio (block 445) is subtracted from the originally calculated harmonics ratio to yield an error (block 450) in accordance with the following equation:

error=Original Harmonics Ratio−Calculated Harmonics Ratio.

This error is provided as a fly-height adjustment signal to a fly-height controller (block 455). The fly-height controller operates as a closed loop adjustment and modifies the fly-height such that the error is driven toward zero.

In conclusion, the invention provides novel systems, devices, methods and arrangements for performing fly-height control based on servo address mark data. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A storage device, the storage device comprising:
a storage medium, wherein the storage medium includes a plurality of servo data regions that each include a servo address mark;
a read/write head assembly disposed in relation to the storage medium; and
a calculation circuit, wherein the calculation circuit is operable to receive the servo address mark from the plurality of servo data regions via the read/write head assembly, and wherein the calculation circuit is operable to calculate a first harmonics ratio based on the servo address mark from the plurality of servo data regions and compares the first harmonics ratio with a second harmonics ratio to determine an error in the distance between the read/write head assembly and the storage medium.

2. The storage device of claim 1, wherein the plurality of servo data regions includes a first servo data region and a second servo data region, wherein the servo address mark from the first servo data region includes at least a first sample, a second sample, a third sample and a fourth sample; wherein the servo address mark from the second servo data region includes at least a fifth sample, a sixth sample, a seventh sample and an eighth sample, and wherein calculating the first harmonics ratio includes:
 forming an averaged sample set, wherein the averaged sample set includes at least a first average value, a second average value, a third average value and a fourth average value, wherein the first average value incorporates the first sample and the fifth sample, wherein the second average value incorporates the second sample and the sixth sample, wherein the third average value incorporates the third sample and the seventh sample, and wherein the fourth average value incorporates the fourth sample and the eighth sample;
 calculating at least two harmonics based on the averaged sample set; and
 calculating a ratio of the two harmonics.

3. The storage device of claim 2, wherein calculating the at least two harmonics based on the averaged sample set includes performing a discrete Fourier transform.

4. The storage device of claim 2, wherein the servo address mark from the first servo data region is identical to the servo address mark from the second servo data region.

5. The storage device of claim 2, wherein the servo address mark from the first servo data region is truncated, and wherein the servo address mark from the second servo data region is truncated.

6. The storage device of claim 5, wherein the truncation removes one or more samples of the servo address mark nearest a preceding pattern in the servo data region.

7. The storage device of claim 6, wherein the preceding pattern is a preamble pattern.

8. The storage device of claim 5, wherein the truncation removes one or more samples of the servo address mark nearest a subsequent pattern in the servo data region.

9. The storage device of claim 8, wherein the subsequent pattern is a Gray code pattern.

10. The storage device of claim 5, wherein the truncation is operable to reduce inter-symbol interference with data proximate to the servo address mark.

11. A method for identifying a distance error based on servo address mark data, the method comprising:
 providing a first harmonics ratio corresponding to a known position;
 providing a storage medium, wherein the storage medium includes a first servo data region and a second servo data region, and wherein both the first servo data region and the second servo data region include a servo address mark;
 accessing the servo address mark from the first servo data region and the servo address mark from the second servo data region;
 calculating a second harmonics ratio based on a combination of the servo address mark from the first servo data region and the servo address mark from the second servo data region; and
 comparing the first harmonics ratio with the second harmonics ratio to determine a distance error.

12. The method of claim 11, wherein the first harmonics ratio is calculated during an initialization phase.

13. The method of claim 11, wherein the servo address mark from the first servo data region includes at least a first sample, a second sample, a third sample and a fourth sample; wherein the servo address mark from the second servo data region includes at least a fifth sample, a sixth sample, a seventh sample and an eighth sample, and wherein calculating the second harmonics ratio includes:
 forming an averaged sample set, wherein the averaged sample set includes at least a first average value, a second average value, a third average value and a fourth average value, wherein the first average value incorporates the first sample and the fifth sample, wherein the second average value incorporates the second sample and the sixth sample, wherein the third average value incorporates the third sample and the seventh sample, and wherein the fourth average value incorporates the fourth sample and the eighth sample;
 calculating at least two harmonics based on the averaged sample set; and
 calculating a ratio of the two harmonics.

14. The method of claim 13, wherein calculating the at least two harmonics based on the averaged sample set includes performing a discrete Fourier transform.

15. The method of claim 13, wherein the servo address mark from the first servo data region is truncated, and wherein the servo address mark from the second servo data region is truncated.

16. The method of claim 15, wherein the truncation removes one or more samples of the servo address mark selected from a group consisting of: one or more samples nearest a preceding pattern in the servo data region, and one or more samples nearest a succeeding pattern in the servo data region.

17. The method of claim 16, wherein the preceding pattern is a preamble pattern, and wherein the subsequent pattern is a Gray code pattern.

18. The method of claim 15, wherein the truncation is operable to reduce inter-symbol interference with data proximate to the servo address mark.

19. A circuit, the circuit comprising:
 a servo address mark detection circuit operable to detect at least a first servo address mark from a first servo data region on a storage medium and a second servo address mark from a second servo data region on the storage medium;
 a sample averaging circuit operable to:
  receive at least a first sample set corresponding to the first servo address mark and a second sample set corresponding to the second servo address mark,
  perform an averaging calculation including at least the first sample set and the second sample set, and
  provide an averaged sample set;
 a discrete Fourier transform circuit that receives the averaged sample set and calculates at least two harmonics; and
 a harmonics ratio calculation circuit, wherein the harmonics ratio calculation circuit calculates a ratio of the two harmonics.

20. The circuit of claim 19, wherein the harmonics ratio is a first harmonics ratio, and wherein the circuit further includes:
 a memory operable to store a second harmonics ratio; and
 a comparator operable to provide a distance error signal based at least in part on a comparison of the first harmonics ratio and the second harmonics ratio.

21. The circuit of claim 19, wherein the first servo address mark is the same as the second servo address mark.

22. The circuit of claim 19, wherein the first servo address mark is truncated, and wherein the second servo address mark is truncated.

23. The circuit of claim 22, wherein the truncation removes one or more samples of the first servo address mark nearest a preceding pattern in the first servo data region.

24. The circuit of claim 23, wherein the preceding pattern is a preamble pattern.

25. The circuit of claim 22, wherein the truncation removes one or more samples of the first servo address mark nearest a subsequent pattern in the second servo data region.

26. The circuit of claim 25, wherein the subsequent pattern is a Gray code pattern.

* * * * *